March 11, 1930.  G. MELLING  1,750,046
COMBINED MILLING AND DRILLING MACHINE
Filed April 29, 1927   7 Sheets-Sheet 2

INVENTOR
George Melling
BY Chappell & Earl
ATTORNEYS

March 11, 1930.  G. MELLING  1,750,046
COMBINED MILLING AND DRILLING MACHINE
Filed April 29, 1927    7 Sheets-Sheet 3

INVENTOR
George Melling
BY
Chappell & Earl
ATTORNEYS

March 11, 1930.   G. MELLING   1,750,046
COMBINED MILLING AND DRILLING MACHINE
Filed April 29, 1927   7 Sheets-Sheet 4

INVENTOR
George Melling
BY Chappell & Earl
ATTORNEYS

March 11, 1930.  G. MELLING  1,750,046
COMBINED MILLING AND DRILLING MACHINE
Filed April 29, 1927  7 Sheets-Sheet 5

INVENTOR
George Melling
BY
Chappell & Earl
ATTORNEYS

March 11, 1930. G. MELLING 1,750,046
COMBINED MILLING AND DRILLING MACHINE
Filed April 29, 1927 7 Sheets-Sheet 6

INVENTOR
George Melling
BY
ATTORNEYS

March 11, 1930.  G. MELLING  1,750,046
COMBINED MILLING AND DRILLING MACHINE
Filed April 29, 1927    7 Sheets-Sheet 7

Patented Mar. 11, 1930

1,750,046

UNITED STATES PATENT OFFICE

GEORGE MELLING, OF JACKSON, MISSISSIPPI

COMBINED MILLING AND DRILLING MACHINE

Application filed April 29, 1927. Serial No. 187,648.

The main objects of this invention are:

First, to provide a combined milling and drilling machine adapted to perform several operations on a piece of work which is automatic in operation and of large capacity.

Second, to provide an improved machine of the class described in which various moving parts are so arranged as to act as counterbalance parts, thereby relieving the mechanism of stresses and also reducing vibration.

Third, to provide an improved machine of the class described in which several operations on the same piece of work are accurately performed without re-chucking or re-adjusting the work in its holder.

Fourth, to provide an improved rotary work turret or table with means for automatically adjusting and positioning or indexing the same for successive operations.

Fifth, to provide an improved automatic work table feed means.

Sixth, to provide in a structure of the class described an automatic control whereby the machine is automatically stopped in the event of failure in proper adjustment and indexing of the parts.

Seventh, to provide an improved work holder.

Objects pertaining to details and economies of construction and operation of my improved machine will definitely appear from the detailed description to follow. The invention is clearly defined and pointed out in the claims.

A structure embodying the features of my invention is clearly illustrated in the accompanying drawing forming a part of this application, in which.

Figures 5, 9, 13, 14, 15:
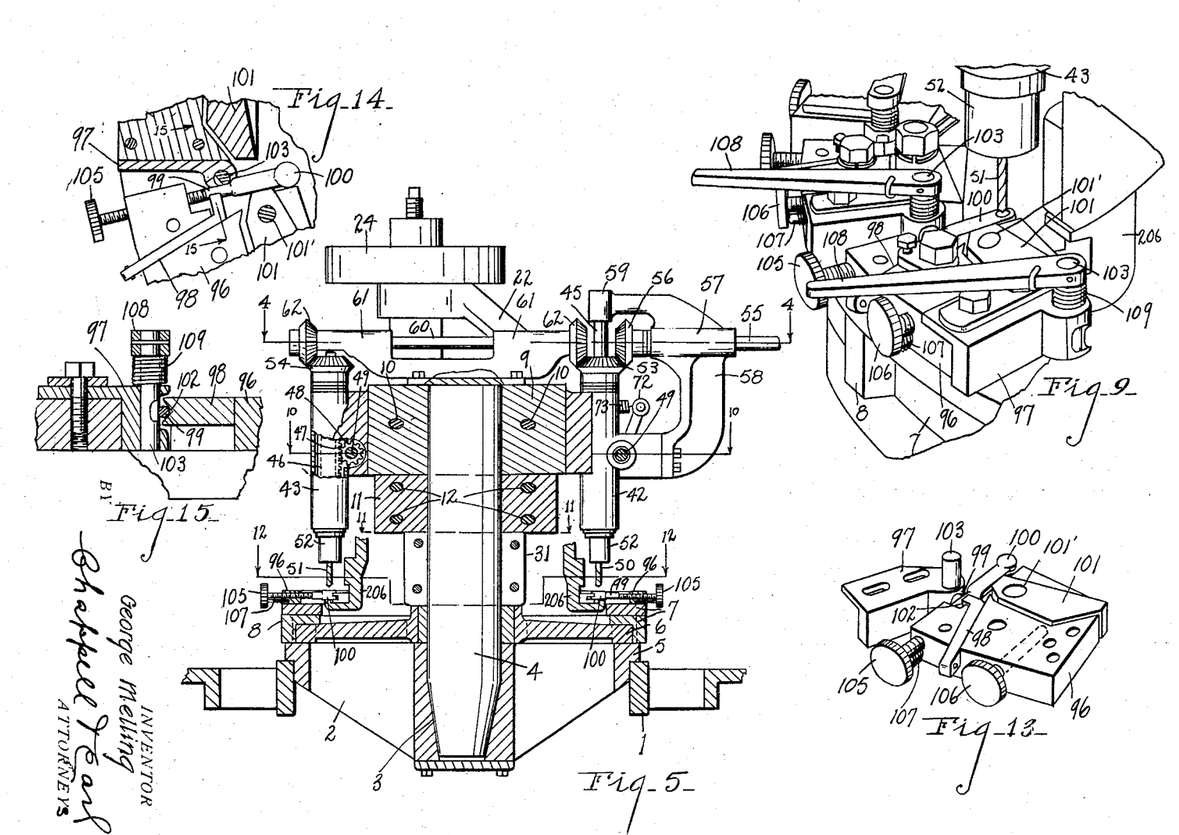
Fig. 5 is a fragmentary view partially in vertical section on a line corresponding to line 5—5 of Figs. 4 and 10.
Fig. 9 is an enlarged fragmentary perspective view of parts shown in Fig. 7, work being shown in one of the work holders and the reamer in retracted position after the hole has been reamed.
Fig. 13 is a fragmentary perspective view of parts of one of the work holders.
Fig. 14 is a fragmentary plan view of one of the work holders, parts being shown in section.
Fig. 15 is a detail section on a line corresponding to line 15—15 of Fig. 14.
Figure 6:
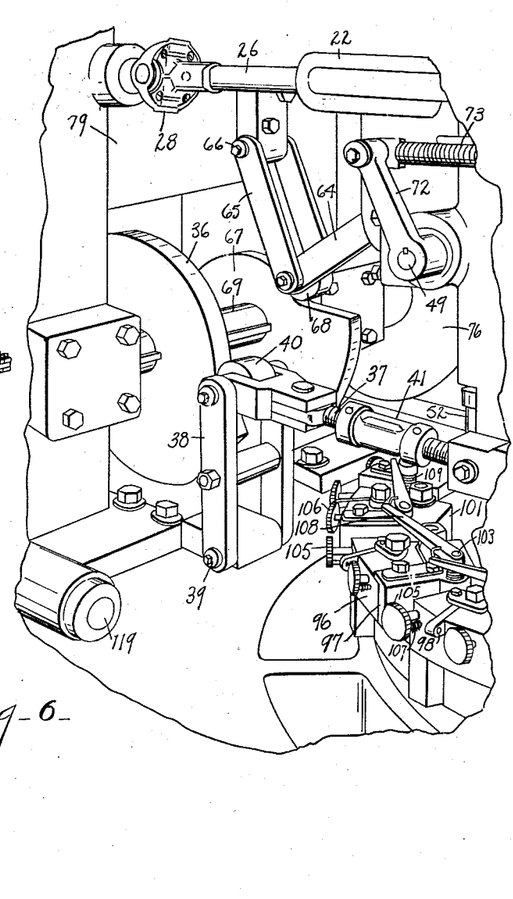
Fig. 6 is an enlarged fragmentary perspective view showing details of the operating and driving connections for various parts.
Figure 7:
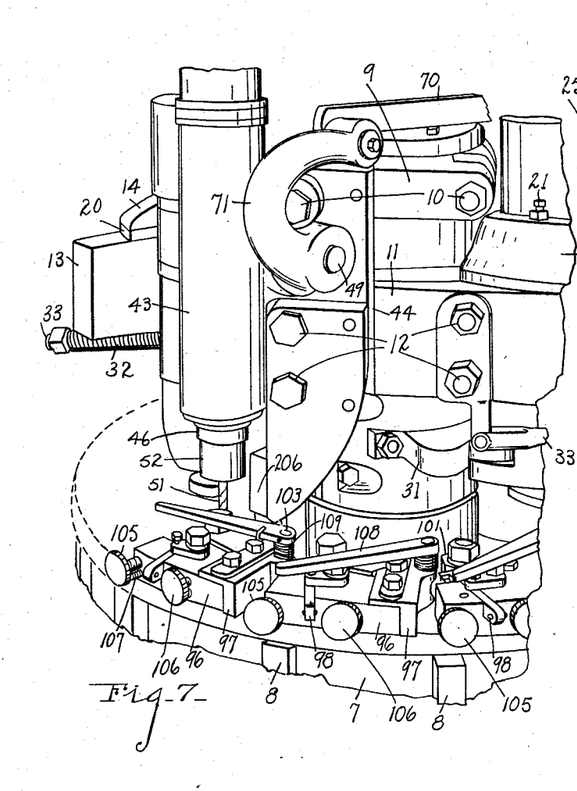
Fig. 7 is a fragmentary perspective view showing the reamer and directly associated parts.

Referring to the drawing, 1 represents the main bed or supporting frame of the machine, this being suitably shaped to provide a support for the various parts of the machine. On this bed I mount a foot member or stirrup 2 having a socket 3 for the upright post 4. The stirrup 2 has an annular rim 5 which serves as a support for the annular way 6, the turret or table 7 being conformed to bear on the top and outer side of this bearing member 6 as shown in Fig. 5.

The table is provided with a plurality of spaced driving and indexing lugs 8. The means for driving the table with a step by step motion will be described later.

The post 4 carries a crosshead or bracket 9 which is clamped upon the post by means of bolts 10. This post also carries the crosshead or bracket 11 which is clamped to the post by means of the bolts 12. The crosshead 11 has outwardly disposed segmental projecting ways 13 for the oscillating carriages 14 which are pivoted at 15 on the projecting arms 16 of this crosshead 11.

Figure 8:
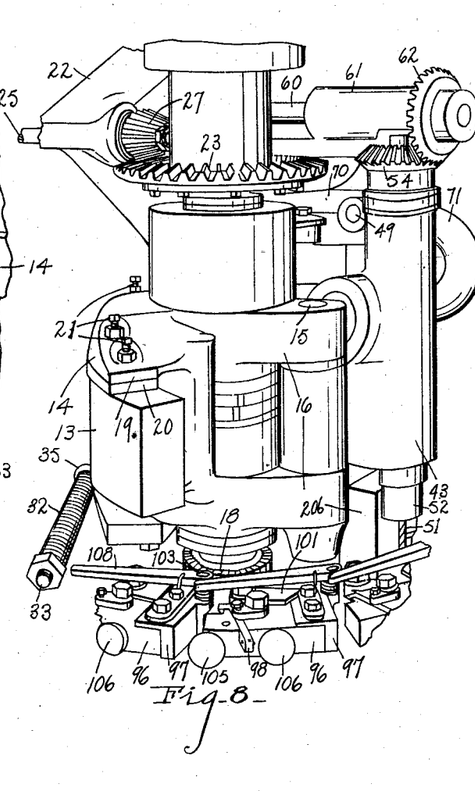
Fig. 8 is a fragmentary perspective view of the last milling cutter and the directly associated parts.

These carriages carry the shafts 17 of the cutters 18 and are provided with suitable bearings for these shafts, not detailed herein. The carriages 14 have slide bearings 19 provided with adjustable friction or bearing plates 20, these plates being adjusted by means of the screws 21, see Fig. 8.

Figure 1:
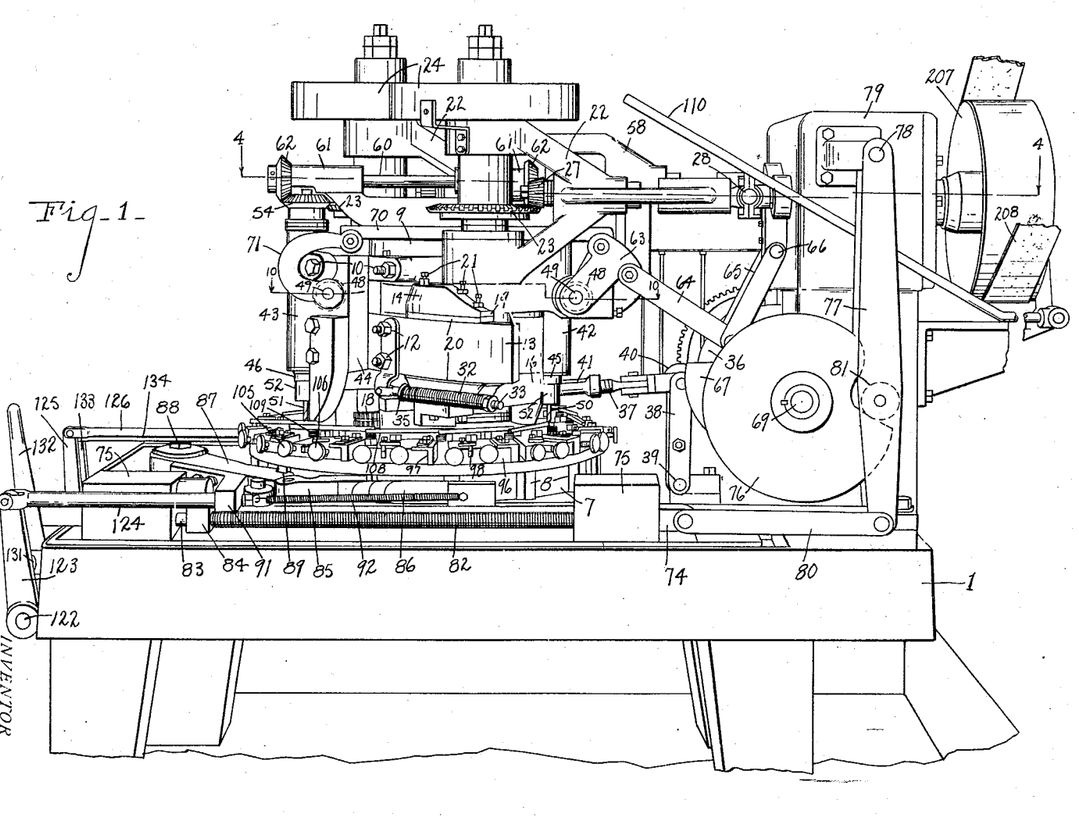
Fig. 1 is a front perspective view of a structure embodying the features of my invention, the parts of the supporting frame being broken away.
Figure 4:
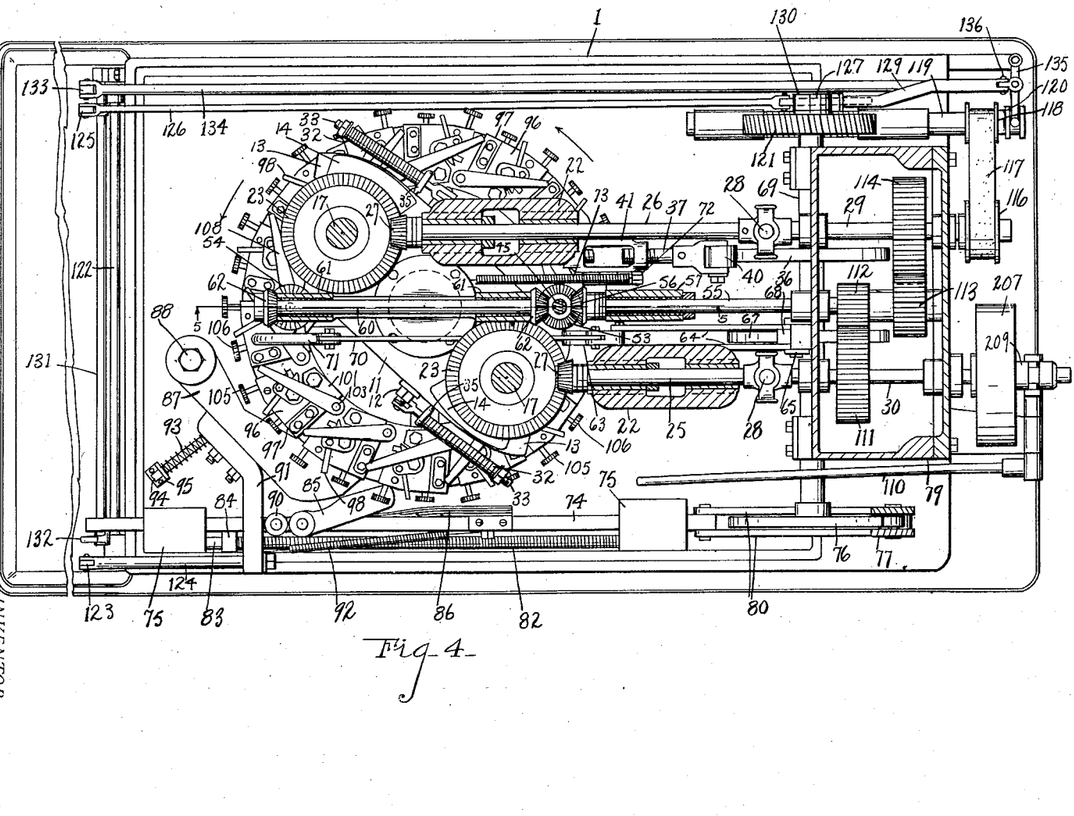
Fig. 4 is a detail view partially in horizontal section on a line corresponding to line 5—5 of Figs. 1, 2 and 5.

These carriages carry forked bearing brackets 22, the brackets having a limited or swinging movement on the shafts while the gears 23 on the shafts 17 are arranged between the arms of the brackets. The brackets are provided with bearings for the driving shafts 25 and 26—see Figs. 1 and 4.

The driving shafts 25 and 26 are provided with beveled gears 27 which mesh with the beveled gears 23. These shafts 25 and 26 are connected by the universal joints 28 to transmission shafts 29 and 30. This transmission will be described later. It should be pointed out at this time, however, that the connection is such that it permits the oscillation of the carriages on their ways without affecting the driving connections.

It will be noted that these carriages 14 are disposed in an opposed relation on opposite sides of the post 4. They are simultaneously operated by means of the double cam 31 which is oscillatingly mounted on the post 4. The carriages are retracted and held yieldingly against the cam 31 by means of the springs 32 which are mounted on the rods 33 to be engaged by the arms 35 on the carriages, the arms having eyes through which the rods 33 are disposed.

The cam 31 is actuated by a cam 36 acting on the push rod 37, one end of which is connected to the cam and the other end of which is supported by the rocking arm 38 pivoted at 39. The arm 38 is provided with a roller 40 coacting with the cam 36. The push rod is provided with a turn buckle 41.

The cutters are, by this arrangement of parts, simultaneously fed to the work and simultaneously retracted. As stated, they are mounted in opposed relation on the crosshead or bracket 11 on the post 4 so that the stresses are largely counterbalanced.

The crosshead or bracket 9 on the post carries the drill housing 42 and the reamer housing 43. These housings are provided with arms 44 lapping upon the ends of the cross member 11 and securely bolted thereto. The spindles 45 and 46 are provided with feed racks 47 with which the feed pinions 48 on the rockshafts 49 coact to advance and retract the drill and reamer which are conventionally shown at 50 and 51, the chucks being conventionally shown at 52.

The drill spindles 45 and 46 are provided with beveled gears 53 and 54, respectively, at their upper ends. The gear 53 is driven from a shaft 55 having a gear 56 thereon meshing with the gear 53. This shaft 55 is supported by a bearing 57 on a yoke-like bracket 58 carried by the housing 42. This bracket also carries a bearing 59 for the upper end of the drill spindle 45. The shaft 55 is driven from the transmission, the details of which will be later described.

The gear 54 of the spindle 46 is connected to the gear 53 by means of the shaft 60 mounted in bearings 61 carried by the post 4 and the beveled gears 62 on the shaft 60 meshing with the gears 53 and 54. The drill spindles are thus driven at the same speed.

The feed racks are also simultaneously actuated, one rockshaft 49 being provided with an arm 63 which is oscillated by the pushrod 64 pivoted at one end to the arm 63 and supported at its outer end by the rocker 65 which is pivoted at 66 to be acted upon by the cam 67. This rocker carries a roller 68 traveling on the cam. The cam 67 and the cam 36 are mounted on a cam shaft 69 disposed transversely of the machine, the driving connections for this shaft being described later.

The arm 63 is connected by a link 70 to an arm 71 on the rockshaft 49 of the second spindle feed pinion. One of the shafts 49 is provided with an arm 72 to which the spring 73 is connected for retracting the spindles.

I will now describe the driving and indexing means for the table or table or turret 7. This consists of a slide 74 mounted in the slide bearings 75 to reciprocate horizontally at the side of the turret. This slide is actuated from the cam 76 on the cam shaft 69, the cam acting upon the lever 77 which is pivoted at 78 on the transmission housing 79 and connected to the slide by means of the link 80. The lever 77 has a roller 81 coacting with the cam.

A coiled spring 82 is supported by a rod 83 through a block 84 projecting from the slide, the spring thrusting against this block and also against the front bearing for the slide 75. The slide carries a feed pawl 85 which is pivoted on the slide to coact with the teeth or lugs 8 on the periphery of the work turret. A leaf spring 86 is mounted on the slide to engage the pawl and urge it to its engaging position.

The holding pawl 87 is pivoted on the frame at 88 to coact with these teeth or lugs 8, the holding pawl having a recess 89 which is a close fit to the lugs 8. The lugs are of rectangular cross section, the purpose of this being to provide an accurate registering fit when the parts are in engagement and holding the table securely in its indexed or operating position. The holding pawl 87 is disengaged by the tappet roller 90 on the slide 74, the holding pawl having a projecting arm 91 with which the roller coacts.

The holding pawl is urged to engaging position by the tension spring 92 which is connected at one end to the arm 91 and at the other end to the slide 74. It will be noted that the cam 76 has a long dwell and a comparatively short and abrupt drop, the dwell positively holding the slide in its advanced position and thereby keeping a holding tension on the retaining pawl through the spring connection described.

To further urge the holding pawl to engaging position and to compensate for the reducing tension when the slide is retracted, I provide a second spring 93 supported by the rod 94 reciprocating through a bracket 95 on the main frame. With the parts thus arranged the holding or locking pawl provides a very strong and secure means for holding the table in its index or adjusted position.

The turret is provided with a plurality of work holders properly positioned relative to the lugs 8 on the turret. These work holders consist of the jaw blocks 96 and 97 disposed in opposed spaced relation, the jaw block 96 having an adjustable jaw 98 adapted to engage the side of the shank 99 of the work 100. At the inner side of the jaw block 96 is a jaw 101 pivoted to the table 101'. The jaw 98 has a notched face 102.

The jaw block 97 carries a segmental jaw 103 rotatable in the jaw block. The positioning screw 105 is arranged to engage the end of the work as shown in Fig. 14 and adjustable to position the work. The jaw 101 is secured in its adjusted positions by means of the set screw 106.

A spring pin 107 is provided to hold the screw 105 in its adjusted position. A corresponding spring pin is provided for the screw 106. The details of these spring detents are not shown as they form no part of this invention.

The oscillating or movable jaw 103 is provided with a handle 108. A spring 109 on the projecting end of the jaw 103 urges the jaw to clamping position. This jaw is arranged to grip the work intermediate the gripping or engaging points of the jaws 98 and 101 as shown in Fig. 14, thereby providing a three-point gripping action for the jaws in addition to the positioning of the positioning screw 105.

The work holder illustrated is especially designed for the particular form of work illustrated but is readily adapted for other forms of work.

The work is held or chucked up in my improved holder so as to effectively support the work while it is subjected to the several operations. At the drilling positions the work is further supported by the anvil or thrust members 206 depending from the bracket carrying the drill spindle housings, the work being carried over these anvils or thrust members.

I will now describe the driving connections for the driven parts heretofore described.

The driving pulley 207 is connected to a suitable source of power by a belt 208 and to the shaft 30 by means of a clutch conventionally indicated at 209. This clutch is controlled by the hand lever 110. The shaft 30 is connected to the shaft 55 which drives the drill spindles as described by means of the gears 111 and 112.

The shaft 29 is connected to the gear 112 by means of the gear 113 directly connected to the gear 112 and the gear 114 on the shaft 29. These gears are arranged in a gear-box or housing 79. The shaft 29 projects from the housing 79 and is provided with a pulley 116 on its projecting end. This pulley is connected by the belt 117 to the pulley 118 on the worm shaft 119. A clutch 120 is provided for connecting the pulley 118 to this worm shaft 119. The worm shaft 119 drives the worm gear 121 on the cam shaft 69. With this driving connection the several parts are driven in synchronism.

Figure 2:
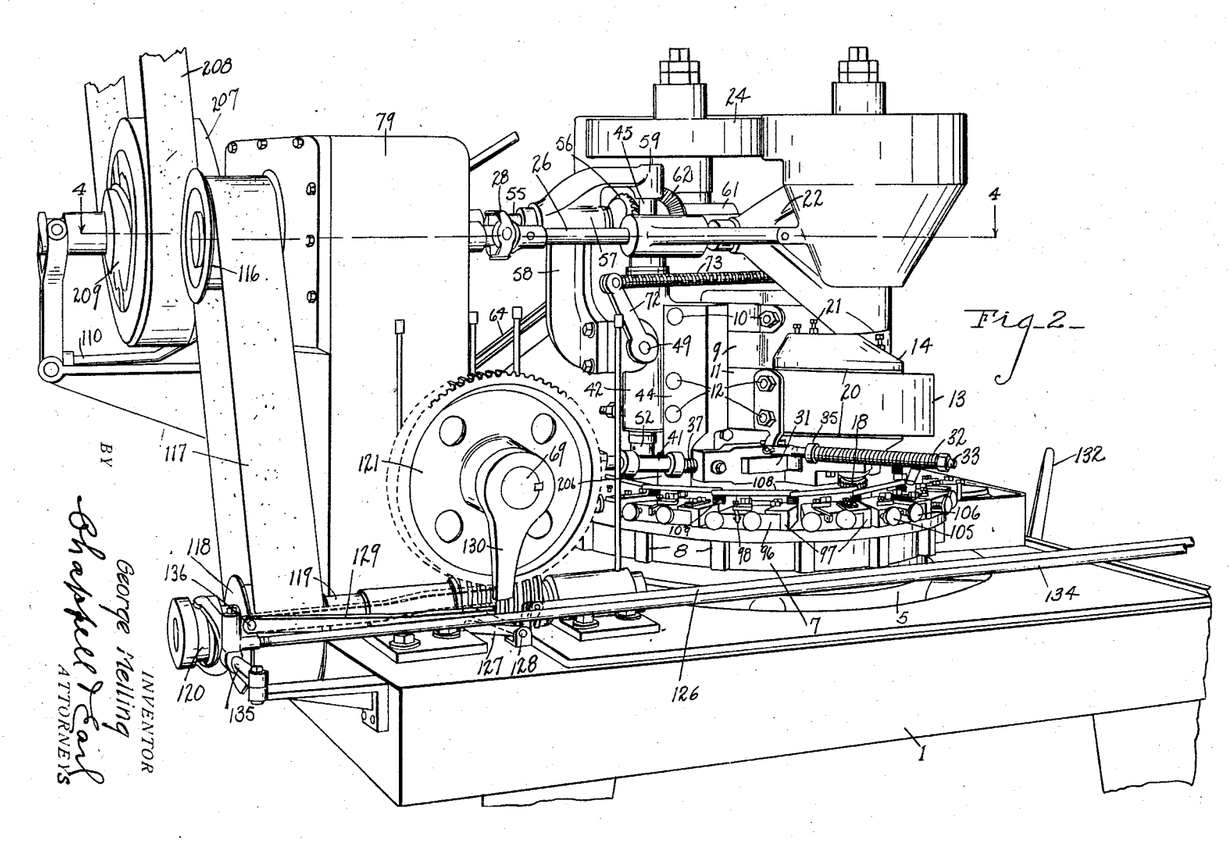
Fig. 2 is a rear perspective view with the parts of the supporting frame broken away.
Figure 3:
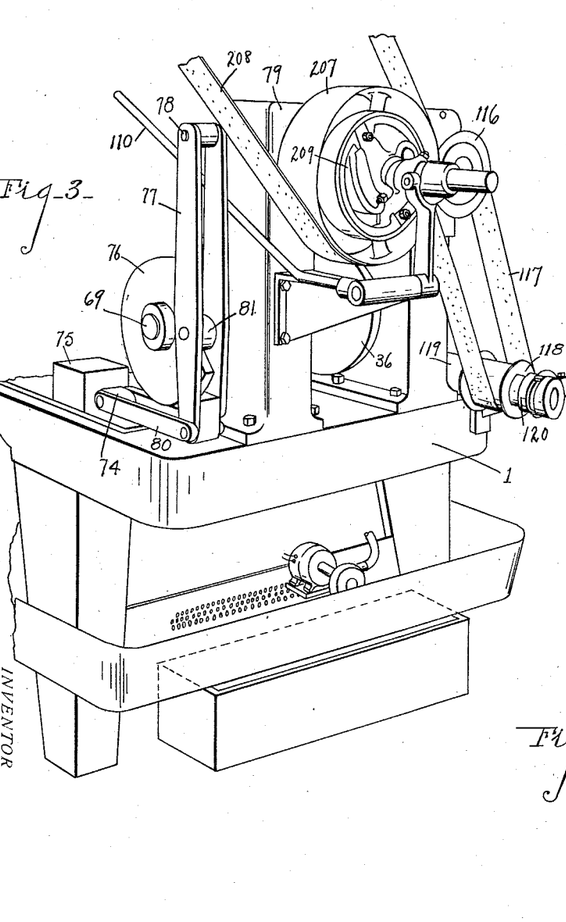
Fig. 3 is an end perspective view looking from the right of Fig. 1 and the left of Fig. 2.

An automatic throw-out means is provided for the clutch 120, this being actuated by the failure of the turret locking or holding pawl 87. This mechanism in the embodiment illustrated comprises a rockshaft 122 disposed at the left hand end of the bed 1 and having an upwardly projecting arm 123 thereon, the arm being connected to the pawl 87 by means of the link 124. At its opposite end the rockshaft 122 is provided with an arm 125 which is connected by the link 126 to a bell crank lever 127 pivoted at 128 and supporting the clutch releasing member 129. The shaft 69 is provided with a tappet 130 which engages this clutch releasing member when it is in its elevated position as shown by dotted lines in Fig. 2, the clutch releasing member being shifted to its elevated or actuated position when the holding pawl is in its retracted turret releasing position, so that in the event of the failure of the holding pawl to return to engaging position the clutch 120 is disengaged, thereby stopping the cam shaft and consequently the parts actuated thereby.

A manually controlled means is provided for releasing this clutch consisting of the rockshaft 131 which is provided with a hand lever 132 and with an arm 133 connected by the link 134 to the clutch lever 135 to which the releasing member 129 is connected at 136.

I will now point out the operation of the machine described:

The operator standing at the front of the machine places the work in the holders as they are successively brought to position and, after one cycle of the turret has been completed, removes the finished work and places the new work in the holders from which the finished work has been removed. To open the work holders in the embodiment illustrated it is only necessary to swing the jaw handle 108 to open the jaw, the spring 109 closing the same when the handle is released.

Figures 10, 11, 12, 16, 17, 18:
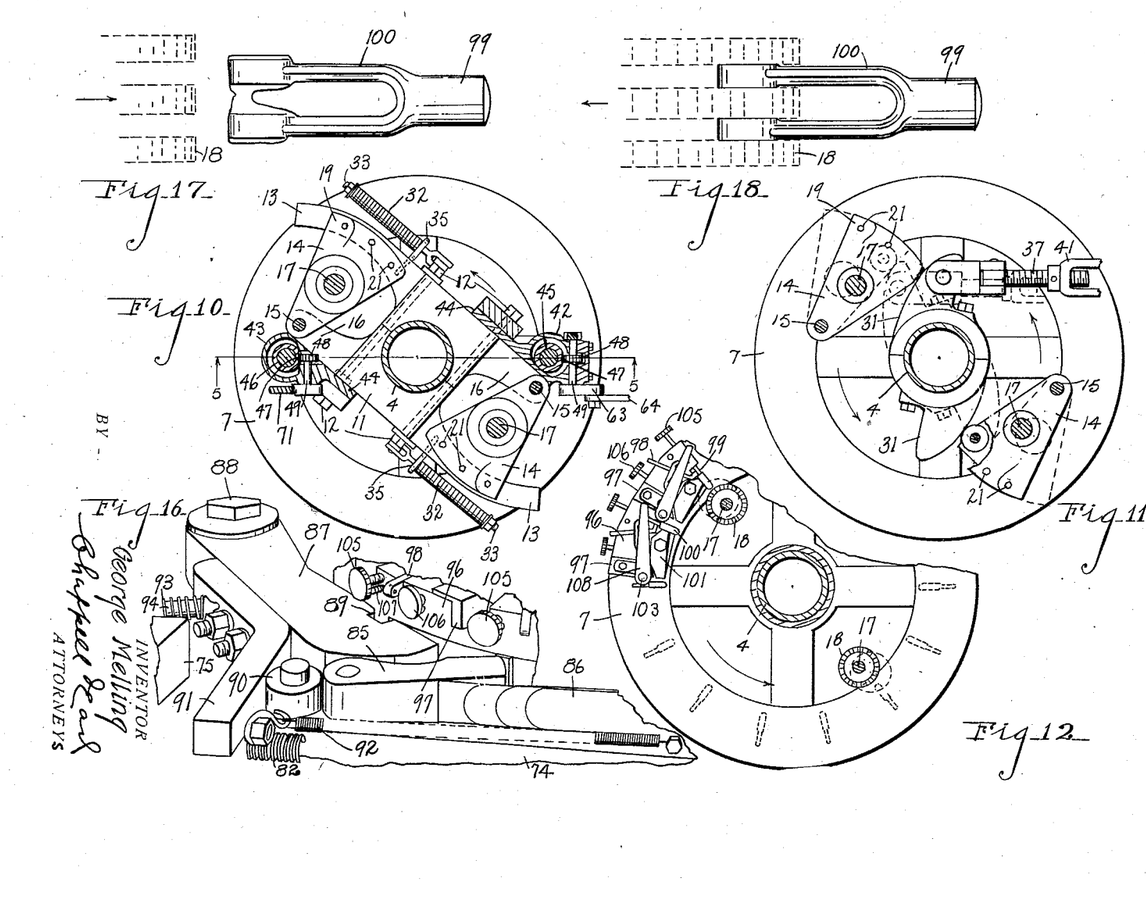
Fig. 10 is a detail section on a line corresponding to the broken line 10—10 of Figs. 1 and 5.
Fig. 11 is a fragmentary horizontal section on a line corresponding to line 11—11 of Fig. 5.
Fig. 12 is a fragmentary horizontal section on the broken line 12—12 of Fig. 5.
Fig. 16 is a fragmentary perspective view showing details of the work table feed and indexing mechanism.
Fig. 17 is a side elevation of a clevice or coupling blank for which the machine illustrated is especially designed or adapted, a set of milling cutters being illustrated by dotted lines in retracted position.
Fig. 18 is a side view of the same parts with a set of milling cutters in their advanced position.

The work, which is illustrated in Fig. 17 as a forging in the rough, is first operated upon by the first milling cutter 18 which is a multiple cutter consisting of a series of three cutters adapted to face off the sides of the clevice as shown in Fig. 18. The holder jaw 101 is slotted on its inner side to receive the cutters.

From this position the work is advanced to the drill 50 and is supported by one of the anvils 106 during the drilling operations. The drill is constantly driven but its feeding is automatically timed through the cam shaft as I have described.

From this drilling position the work is advanced to the second or finishing cutters which remove the burr formed by the drill and finish the faces of the work. The work is then advanced to the reaming position, the reamer 57 reaming and finishing the hole.

As I have pointed out, the parts are so arranged that the cutters are simultaneously advanced to and retracted from the work, these parts being oppositely disposed and balanced so that the strain and vibration are minimized. The drilling units are also arranged in opposed balanced relation.

The structure illustrated and described is of very large capacity and performs its work in a highly efficient manner. I have not attempted to illustrate or describe various modifications and adaptations of my improvements to other kinds of work as I believe the disclosure made will enable those skilled in the art to which my invention relates to embody or adapt the same as may be desired.

Having thus described my invention, what I claim as new and desire to secure by Letters Patent, is:

1. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said crosshead in opposed relation and provided with slide bearings coacting with said ways, a double lobed cam mounted on said post to coact with said carriages whereby they are simultaneously actuated, springs acting to retract said carriages, cutter shafts disposed vertically on said carriages and provided with cutters at their lower ends and with flywheels at their upper ends, forked bearing brackets mounted between said carriages and flywheels, beveled gears arranged on said cutter shafts between the forks of said bearing brackets, driving shafts supported by said bearing brackets and provided with beveled gears coacting with said gears on said cutter shafts, a second crosshead mounted on said post above said cutter supporting crosshead, drill units mounted in opposed relation on said second crosshead and provided with spindles having beveled gears at their upper ends, a shaft disposed centrally above said post and provided with gears coacting with both of the gears on said spindles, a driving shaft provided with a gear meshing with the gear of one of said spindles, and feed means for said spindles synchronized with said tool carriage actuating cam.

2. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said crosshead in opposed relation and provided with slide bearings coacting with said ways, a double lobed cam mounted on said post to coact with said carriages whereby they are simultaneously actuated, springs acting to retract said carriages, cutter shafts disposed vertically on said carriages and provided with cutters at their lower ends and with flywheels at their upper ends, forked bearing brackets mounted between said carriages and flywheels, beveled gears arranged on said cutter shafts between the forks of said bearing brackets, driving shafts supported by said bearing brackets and provided with beveled gears coacting with said gears on said cutter shafts, a second crosshead mounted on said post above said cutter supporting crosshead, drill units mounted in opposed relation on said second crosshead, and feed means for said spindles synchronized with said tool carriage actuating cam.

3. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said crosshead in opposed relation and provided with slide bearings coacting with said ways, a double lobed cam mounted on said post to coact with said carriages whereby they are simultaneously actuated, springs acting to retract said carriages, cutter shafts disposed vertically on said carriages and provided with cutters, driving means for said shafts, beveled gears arranged on said cutter shafts between the forks of said bearing brackets, driving shafts supported by said bearing brackets and provided with beveled gears coacting with said gears on said cutter shafts, a second crosshead mounted on said post above said cutter supporting crosshead, drill units mounted in opposed relation on said second crosshead and provided with spindles having beveled gears at their upper ends, a shaft disposed centrally above said post and provided with gears coacting with both of the gears on said spindles, a driving shaft provided with a gear meshing with the gear of one of said spindles, and feed means for said spindles synchronized with said tool carriage actuating cam.

4. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said cross-head in opposed relation and provided with slide bearings coacting with said ways, a double lobed cam mounted on said post to coact with said carriages whereby they are simultaneously actuated, springs acting to retract said carriages, cutter shafts disposed vertically on said carriages and provided with cutters, driving means for said shafts, beveled gears arranged on said cutter shafts between the forks of said bearing brackets, driving shafts supported by said bearing brackets and provided with beveled gears coacting with said gears on said cutter shafts, a second crosshead mounted on said post above said cutter supporting crosshead, drill units mounted in opposed relation on said second crosshead, and feed means for said spindles synchronized with said tool carriage actuating cam.

5. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said crosshead in opposed relation and provided with slide bearings coacting with said ways, a double lobed cam coacting with said carriages whereby they are simultaneously actuated, springs acting to retract said carriages, cutter shafts disposed vertically on said carriages and provided with cutters at their lower ends and with flywheels at their upper ends, forked bearing brackets mounted between said carriages and flywheels, beveled gears arranged on said cutter shafts between the forks of said bearing brackets, and driving shafts supported by said bearing brackets and provided with beveled gears coacting with said gears on said cutters.

6. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said crosshead in opposed relation and provided with slide bearings coacting with said ways, a double lobed cam coacting with said carriages whereby they are simultaneously actuated, springs acting to retract said carriages, and cutter shafts disposed vertically on said carriages and provided with cutters.

7. The combination of a rotatable work table provided with a plurality of work holders, means for actuating said work table with a step by step movement, a post disposed centrally relative to said work table, a crosshead mounted on said post and provided with oppositely disposed segmental ways, tool carriages oscillatingly mounted on said crosshead in opposed relation and provided with slide bearings coacting with said ways, and a double lobed cam coacting with said carriages whereby they are simultaneously actuated.

8. The combination of a rotatable work table provided with a plurality of work holders, means for actuating said work table with a step by step movement, a post disposed centrally relative to said work table, a crosshead mounted on said post, drill units mounted in opposed relation to said crosshead and provided with spindles having beveled gears at their upper ends, a transmission shaft disposed centrally between said spindles and provided with gears coacting with the gears of said spindles, a driving shaft provided with a gear meshing with the gear of one of said spindles, and feed means for said spindles synchronized with said table actuating means.

9 In a machine of the class described, the combination of a rotatable work table provided with a plurality of work holders, means for actuating said work table with a step by step movement, tool carriages oscillatingly mounted above said table in opposed relation, a cam coacting with said carriages whereby they are simultaneously actuated, cutter shafts disposed vertically on said carriages and provided with cutters at their lower ends and with flywheels at their upper ends, forked bearing brackets mounted between said carriages and flywheels, beveled gears arranged on said cutter shafts between the forks of said bearing brackets, driving shafts supported by said bearing brackets and provided with beveled gears coacting with said gears on said cutter shafts, drill units mounted in opposed relation above said table and provided with drill spindles having beveled gears at their upper ends, a transmission shaft provided with gears coacting with both of the gears on said spindles, a driving shaft provided with a gear meshing with the gear of one of the said spindles, and feed means for said spindles synchronized with said carriage actuating cam.

10. In a machine of the class described, the combination of a rotatable work table provided with a plurality of work holders, means for actuating said work table with a step by step movement, tool carriages oscillatingly mounted above said table in opposed relation, a cam coacting with said carriages whereby they are simultaneously actuated, cutter shafts disposed vertically on said carriages and provided with cutters, drill units mounted in opposed relation above said table and provided with drill spindles, and feed means for said spindles synchronized with said carriage actuating cam.

11. The combination of a rotatable work table provided with a plurality of work holders, means for actuating said work table with a step by step movement, tool carriages oscillatingly mounted above said work table in opposed relation, means for simultaneously actuating said carriages in opposite directions, cutter shafts mounted on said carriages and provided with cutters, means for driving said cutter shafts, drill units mounted in opposed relation above said table and in intermediate relation relative to said tool carriages and provided with spindles having feed racks, beveled gears on the upper ends of said spindles, a transmission shaft provided with gears coacting with the gears of said spindles, a driving shaft provided with a gear meshing with the gear of one of said spindles, rockshafts provided with pinions coacting with said spindle feed racks and with arms, a link connecting said arms whereby the racks are simultaneously advanced and retracted, an actuating cam operatively associated with one of the rockshaft arms, and an actuating cam for said tool carriages operatively associated with said spindle feed cam and work table feed means whereby the actuation of the work table and tool carriages and the feeding of the spindles are synchronized.

12. The combination of a rotatable work table provided with a plurality of work holders, means for actuating said working table with a step by step movement, tool carriages oscillatingly mounted above said work table in opposed relation, means for simultaneously actuating said carriages in opposite directions, cutter shafts mounted on said carriages and provided with cutters, means for driving said cutter shafts, drill units mounted in opposed relation above said table and in intermediate relation relative to said tool carriages and provided with spindles having feed racks, rockshafts provided with pinions coacting with said spindle feed racks and with arms, a link connecting said arms whereby the racks are simultaneously advanced and retracted, an actuating cam operatively associated with one of the rockshaft arms, and an actuating cam for said tool carriages operatively associated with said spindle feed cam and work table feed means whereby the actuation of the work table and tool carriages and the feeding of the spindles are synchronized.

13. In a machine of the class described, the combination of a rotatable work table provided with a plurality of work holders, means for actuating said work table with a step by step movement, tool carriages oscillatingly mounted above said table in opposed relation, a cam coacting with said carriages whereby they are simultaneously actuated, cutter shafts on said carriages provided with cutters and with flywheels, means for driving said shafts, drill units mounted in opposed relation above said table, and feed means for said spindles synchronized with said carriage actuating cam and table actuating means.

14. The combination of a rotatable work table provided with a plurality of work holders, means for actuating said work table with a step by step movement, tool carriages oscillatingly mounted above said work table in opposed relation, means for simultaneously actuating said carriages in opposite directions, cutter shafts mounted on said carriages and provided with cutters and with flywheels, means for driving said cutter shafts, drill units mounted in opposed relation above said table and in intermediate relation relative to said tool carriages and provided with spindles, beveled gears on the upper ends of said spindles, a transmission shaft provided with gears coacting with the gears of said spindles, a driving shaft provided with a gear meshing with the gear of one of said spindles, feed means for said spindles, and an actuating means for said carriages operatively associated with said table actuating means and spindle feed means whereby the actuation of the work table and carriages and the feeding of the spindles are synchronized.

15. The combination of a rotatable work table provided with a plurality of work holders, means for actuating said work table with a step by step movement, tool carriages oscillatingly mounted above said work table in opposed relation, means for simultaneously actuating said carriages in opposite directions, cutter shafts mounted on said carriages and provided with cutters and with flywheels, means for driving said cutter shafts, drill units mounted in opposed relation above said table and in intermediate relation relative to said tool carriages and provided with spindles, and an actuating means for said carriages operatively associated with said table actuating means and spindle feed means whereby the actuation of the work table and carriages and the feeding of the spindles are synchronized.

16. The combination of a rotatable work table provided with a plurality of work holders, means for actuating said work table with a step by step movement, tool carriages oscillatingly mounted above said work table in opposed relation, means for simultaneously actuating said carriages in opposite directions, cutter shafts mounted on said carriages and provided with cutters and with flywheels, means for driving said cutter shafts, and an actuating means for said carriages operatively associated with said table actuating means and spindle feed means whereby the actuation of the work table and carriages and the feeding of the spindles are synchronized.

17. In a machine of the class described, the combination of a work table provided with index lugs, an actuating slide, a cam shaft provided with an actuating cam for said slide, a return spring for said slide, a driving pawl mounted on said slide to coact with said index lugs, a pivotally mounted holding pawl coacting with said index lugs and provided with a tappet arm, a tappet on said slide coacting with said tappet arm on said holding pawl whereby the holding pawl is disengaged on the return stroke of the slide, an actuating spring for said holding pawl connected to said slide, an auxiliary spring urging said holding pawl to engaging position, driving means for said cam shaft including a clutch, a tappet on said cam shaft, a pivotally mounted clutch releasing member adapted to swing into the path of said tappet on said cam shaft, a bell crank lever adapted to support the swinging end of said releasing member, a rockshaft provided with a pair of arms, a link connecting one of said arms to said tappet arm on said holding pawl, and a link connecting the other arm of said rockshaft to said bell crank lever whereby said releasing member is swung into the path of said tappet on said cam shaft when the holding pawl is in disengaged position.

18. In a machine of the class described, the combination of a work table provided with index lugs, an actuating slide, a cam shaft provided with an actuating cam for said slide, a return spring for said slide, a driving pawl mounted on said slide to coact with said index lugs, a pivotally mounted holding pawl coacting with said index lugs and provided with a tappet arm, a tappet on said slide coacting with said tappet arm on said holding pawl whereby the holding pawl is disengaged on the return stroke of the slide, an actuating spring for said holding pawl connected to said slide, an auxiliary spring urging said holding pawl to engaging position, driving means for said cam shaft including a clutch, a tappet on said cam shaft, a pivotally mounted clutch releasing member adapted to swing into the path of said tappet on said cam shaft, a bell crank lever adapted to support the swinging end of said releasing member, and operating connections for said holding pawl to said bell crank lever.

19. In a machine of the class described, the combination of a work table provided with index lugs, an actuating slide, a cam shaft provided with an actuating cam for said slide, a return spring for said slide, a driving pawl mounted on said slide to coact with said index lugs, a pivotally mounted holding pawl coacting with said index lugs and provided with a tappet arm, a tappet on said slide coacting with said tappet arm on said holding pawl whereby the holding pawl is disengaged on the return stroke of the slide, an actuating spring for said holding pawl connected to said slide, an auxiliary spring urging said holding pawl to engaging position, driving means for said cam shaft including a clutch, and operating connections for said holding pawl to said clutch.

20. In a machine of the class described, the combination of a work table, an indexing pawl carrier provided with a driving pawl coacting with said work table, a holding pawl, a tappet on said carrier acting to release said holding pawl on the return stroke of the pawl carrier, an actuating cam for said pawl carrier, a driving clutch for said actuating cam, a tappet operatively associated with said cam, a clutch releasing member adjustably supported relative to said tappet, and a control member for said releasing member operatively connected to said holding pawl whereby the clutch releasing member is shifted into operative relation to the tappet when the holding pawl is disengaged.

21. In a machine of the class described, the combination of a work table, an indexing pawl carrier provided with a driving pawl coacting with said work table, a holding pawl, a tappet on said carrier acting to release said holding pawl on the return stroke of the pawl carrier, an actuating cam for said pawl carrier, a driving clutch for said actuating cam, and operating connections for said holding pawl to said clutch whereby the clutch is automatically disengaged on the failure of the holding pawl to operatively engage the table.

22. In a machine of the class described, the combination of a work table, a work holder comprising a pair of spaced adjustable jaws adapted to engage the side of the work, a coacting rotatably mounted segmental jaw disposed transversely of the work in opposed relation to said pairs of jaws and adapted to engage the work between said pairs of jaws with a camming action, and a screw positioning member disposed to coact with the end of the work engaged by said jaws.

23. In a machine of the class described, the combination of a work table, a work holder comprising a pair of spaced jaws adapted to engage the side of the work, a coacting jaw disposed in opposed relation to said pairs of jaws and adapted to engage the work between said pairs of jaws with a camming action, and a screw positioning member disposed to coact with the end of the work engaged by said jaws.

24. In a machine of the class described, the combination of a work table, a work holder comprising a pair of spaced adjustable jaws adapted to engage the side of the work, and a coacting rotatably mounted segmental jaw disposed in opposed relation to said pairs of jaws and adapted to engage the work between said pairs of jaws with a camming action.

25. In a machine of the class described, the combination of a rotatable work table provided with a plurality of work holders, means for actuating said work table with a step by step movement, tool carriages pivotally mounted above said work table with their pivots in opposed relation relative to the axis of the table, ways for the swinging ends of said tool carriages, cutter shafts provided with cutters mounted on said tool carriages in opposed relation relative to the axis of the table, a double lobed cam having its axis coincident with that of said table coacting with said carriages whereby they are simultaneously actuated, drill units mounted in opposed relation relative to the axis of the table, and feed means for said spindles synchronized with said carriage actuating mechanism and table actuating means.

26. In a machine of the class described, the combination of a rotatable work table provided with a plurality of work holders, means for actuating said work table with a step by step movement, tool carriages pivotally mounted above said work table with their pivots in opposed relation relative to the axis of the table, ways for the swinging ends of said tool carriages, cutter shafts provided with cutters mounted on said tool carriages in opposed relation relative to the axis of the table, and a double lobed cam having its axis coincident with that of said table coacting with said carriages whereby they are simultaneously actuated.

27. In a machine of the class described, the combination of a rotatable work table provided with a plurality of work holders, means for actuating said work table with a step by step movement, tool carriages pivotally mounted above said work table with their pivots in opposed relation relative to the axis of the table, ways for the swinging ends of said tool carriages, cutter shafts provided with cutters mounted on said tool carriages in opposed relation relative to the axis of the table, means for simultaneously oscillating said carriages, drill units mounted in opposed relation relative to the axis of the table, and feed means for said spindles synchronized with said carriage actuating mechanism and table actuating means.

28. In a machine of the class described, the combination of a rotatable work table provided with a plurality of work holders, means for actuating said work table with a step by step movement, tool carriages pivotally mounted above said work table with their pivots in opposed relation relative to the axis of the table, ways for the swinging ends of said tool carriages, cutter shafts provided with cutters mounted on said tool carriages in opposed relation relative to the axis of the table, and means for simultaneously oscillating said carriages.

29. In a machine of the class described, the combination of a rotatable work table provided with a plurality of work holders, means for actuating said work table with a step by step movement, tool carriages oscillatingly mounted above said work table in opposed relation relative to the axis of the table, cutter shafts provided with cutters mounted on said tool carriages in opposed relation relative to the axis of the table, a double lobed cam having its axis coincident with that of said table coacting with said carriages whereby they are simultaneously actuated, drill units mounted in opposed relation relative to the axis of the table, and feed means for said spindles synchronized with said carriage actuating mechanism and table actuating means.

30. In a machine of the class described, the combination of a rotatable work table provided with a plurality of work holders, means for actuating said work table with a step by step movement, tool carriages oscillatingly mounted above said work table in opposed relation relative to the axis of the table, cutter shafts provided with cutters mounted on said tool carriages in opposed relation relative to the axis of the table, and a double lobed cam having its axis coincident with that of said table coacting with said carriages whereby they are simultaneously actuated.

31. In a machine of the class described, the combination with a work table, an indexing pawl carrier provided with a driving pawl coacting with said work table, a holding pawl, a tappet on said carrier acting to release said holding pawl on the return stroke of the pawl carrier, an actuating means for said pawl carrier, a driving clutch for said actuating means, and operating connections for said holding pawl to said clutch whereby the clutch is automatically disengaged on the failure of the holding pawl to operatively engage the table.

32. In a machine of the class described, the combination with a work table, an indexing pawl coacting with said work table, a holding pawl, means acting to release said holding pawl on the return stroke of the indexing pawl, an actuating means for said indexing pawl, a driving clutch for said actuating means, and operating connections for said holding pawl to said clutch whereby the clutch is automatically disengaged on the failure of the holding pawl to operatively engage the table.

In witness whereof I have hereunto set my hand.

GEORGE MELLING.

CERTIFICATE OF CORRECTION.

Patent No. 1,750,046.                        Granted March 11, 1930, to

GEORGE MELLING.

It is hereby certified that error appears in the above numbered patent requiring correction as follows: In the grant and in the heading to the printed specification the residence of the patentee was erroneously written and printed as "Jackson, Mississippi", whereas said residence should have been written and printed as "Jackson, Michigan"; and that the said Letters Patent should be read with this correction therein that the same may conform to the record of the case in the Patent Office.

Signed and sealed this 22nd day of April, A. D. 1930.

M. J. Moore,
Acting Commissioner of Patents.

(Seal)